United States Patent
Smalls

[11] Patent Number: 5,914,651
[45] Date of Patent: Jun. 22, 1999

[54] VEHICLE SAFETY EMERGENCY FLASHER SYSTEM

[76] Inventor: Bryan H. Smalls, 1607 Joye St. West, Columbia, S.C. 29169

[21] Appl. No.: 08/985,324

[22] Filed: Dec. 4, 1997

[51] Int. Cl.[6] .................................................. B60Q 1/00
[52] U.S. Cl. ........................ 340/436; 340/435; 340/902; 340/942; 340/468; 340/471
[58] Field of Search ..................................... 340/435, 436, 340/902, 942, 943, 468, 469, 471, 472

[56] References Cited

U.S. PATENT DOCUMENTS

| | | | |
|---|---|---|---|
| 3,629,821 | 12/1971 | Dobbins | 340/471 |
| 3,876,940 | 4/1975 | Wickord et al. | 340/902 |
| 4,249,160 | 2/1981 | Chilvers | 340/471 |
| 4,403,208 | 9/1983 | Hodgson et al. | 340/902 |
| 5,005,004 | 4/1991 | Udofoot | 340/942 |
| 5,119,067 | 6/1992 | Adell | 340/468 |
| 5,289,181 | 2/1994 | Watanabe et al. | 340/902 |
| 5,307,060 | 4/1994 | Prevulsky et al. | 340/902 |
| 5,347,261 | 9/1994 | Adell | 340/471 |
| 5,499,009 | 3/1996 | Davis | 340/468 |
| 5,663,705 | 9/1997 | Pretorius et al. | 340/468 |
| 5,754,097 | 5/1998 | Vredenburgh | 340/471 |

Primary Examiner—Jeffery A. Hofsass
Assistant Examiner—Ashok Mannava

[57] ABSTRACT

A new Vehicle Safety Emergency Flasher System for automatically operating a flashing light system within a vehicle by sensing when there is another approaching vehicle thereby protecting oncoming drivers while conserving a charge within a battery of the vehicle. The inventive device includes a plurality of photo-transistors, a control panel having a central processing unit electrically coupled to the photo-transistors, a multi-positioned hazard switch electrically coupled to the control panel, a receiver, and a transmitter. The photo-transistors detect motion from moving vehicles or light from the headlights of a vehicle thereby triggering the flashing of a plurality of conventional hazard lights electrically coupled to the control panel. After the vehicle has passed, the conventional hazard lights are deactivated thereby conserving a charge within a battery of the vehicle.

13 Claims, 3 Drawing Sheets

VEHICLE SAFETY EMERGENCY FLASHER SYSTEM

BACKGROUND OF THE INVENTION

1. Field of the Invention

The present invention relates to Vehicle Emergency Flasher Devices and more particularly pertains to a new Vehicle Safety Emergency Flasher System for automatically operating a flashing light system within a vehicle by sensing when there is another approaching vehicle thereby protecting oncoming drivers while conserving a charge within a battery of the vehicle.

2. Description of the Prior Art

The use of Vehicle Emergency Flasher Devices is known in the prior art. More specifically, Vehicle Emergency Flasher Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Emergency Flasher Devices include U.S. Pat. Nos. 5,255,164; 5,103,383; 4,751,494; 3,908,179; 4,893,111 and U.S. Design Pat. No. 254,298.

While these devices fulfill their respective, particular objectives and requirements, the aforementioned patents do not disclose a new Vehicle Safety Emergency Flasher System. The inventive device includes a plurality of photo-transistors, a control panel having a central processing unit electrically coupled to the photo-transistors, a multi-positioned hazard switch electrically coupled to the control panel, a receiver, and a transmitter.

In these respects, the Vehicle Safety Emergency Flasher System according to the present invention substantially departs from the conventional concepts and designs of the prior art, and in so doing provides an apparatus primarily developed for the purpose of automatically operating a flashing light system within a vehicle by sensing when there is another approaching vehicle thereby protecting oncoming drivers while conserving a charge within a battery of the vehicle.

SUMMARY OF THE INVENTION

In view of the foregoing disadvantages inherent in the known types of Vehicle Emergency Flasher Devices now present in the prior art, the present invention provides a new Vehicle Safety Emergency Flasher System construction wherein the same can be utilized for automatically operating a flashing light system within a vehicle by sensing when there is another approaching vehicle thereby protecting oncoming drivers while conserving a charge within a battery of the vehicle.

The general purpose of the present invention, which will be described subsequently in greater detail, is to provide a new Vehicle Safety Emergency Flasher System apparatus and method which has many of the advantages of the Vehicle Emergency Flasher Devices mentioned heretofore and many novel features that result in a new Vehicle Safety Emergency Flasher System which is not anticipated, rendered obvious, suggested, or even implied by any of the prior art Vehicle Emergency Flasher Devices, either alone or in any combination thereof.

To attain this, the present invention generally comprises a plurality of photo-transistors, a control panel having a central processing unit electrically coupled to the photo-transistors, a multi-positioned hazard switch electrically coupled to the control panel, a receiver, and a transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Vehicle Safety Emergency Flasher System apparatus and method which has many of the advantages of the Vehicle Emergency Flasher Devices mentioned heretofore and many novel features that result in a new Vehicle Safety Emergency Flasher System which is not anticipated, rendered obvious, suggested, or even implied by any of the prior art Vehicle Emergency Flasher Devices, either alone or in any combination thereof.

It is another object of the present invention to provide a new Vehicle Safety Emergency Flasher System which may be easily and efficiently manufactured and marketed.

It is a further object of the present invention to provide a new Vehicle Safety Emergency Flasher System which is of a durable and reliable construction.

An even further object of the present invention is to provide a new Vehicle Safety Emergency Flasher System which is susceptible of a low cost of manufacture with regard to both materials and labor, and which accordingly is then susceptible of low prices of sale to the consuming public, thereby making such Vehicle Safety Emergency Flasher System economically available to the buying public.

Still yet another object of the present invention is to provide a new Vehicle Safety Emergency Flasher System which provides in the apparatuses and methods of the prior art some of the advantages thereof, while simultaneously overcoming some of the disadvantages normally associated therewith.

Still another object of the present invention is to provide a new Vehicle Safety Emergency Flasher System for automatically operating a flashing light system within a vehicle by sensing when there is another approaching vehicle thereby protecting oncoming drivers while conserving a charge within a battery of the vehicle.

Yet another object of the present invention is to provide a new Vehicle Safety Emergency Flasher System which includes a plurality of photo-transistors, a control panel having a central processing unit electrically coupled to the photo-transistors, a multi-positioned hazard switch electrically coupled to the control panel, a receiver, and a transmitter.

Still yet another object of the present invention is to provide a new Vehicle Safety Emergency Flasher System that forewarns oncoming traffic that a disabled vehicle exists on the road.

Even still another object of the present invention is to provide a new Vehicle Safety Emergency Flasher System that operates only upon detecting an approaching vehicle, thereby saving a charge within a battery of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
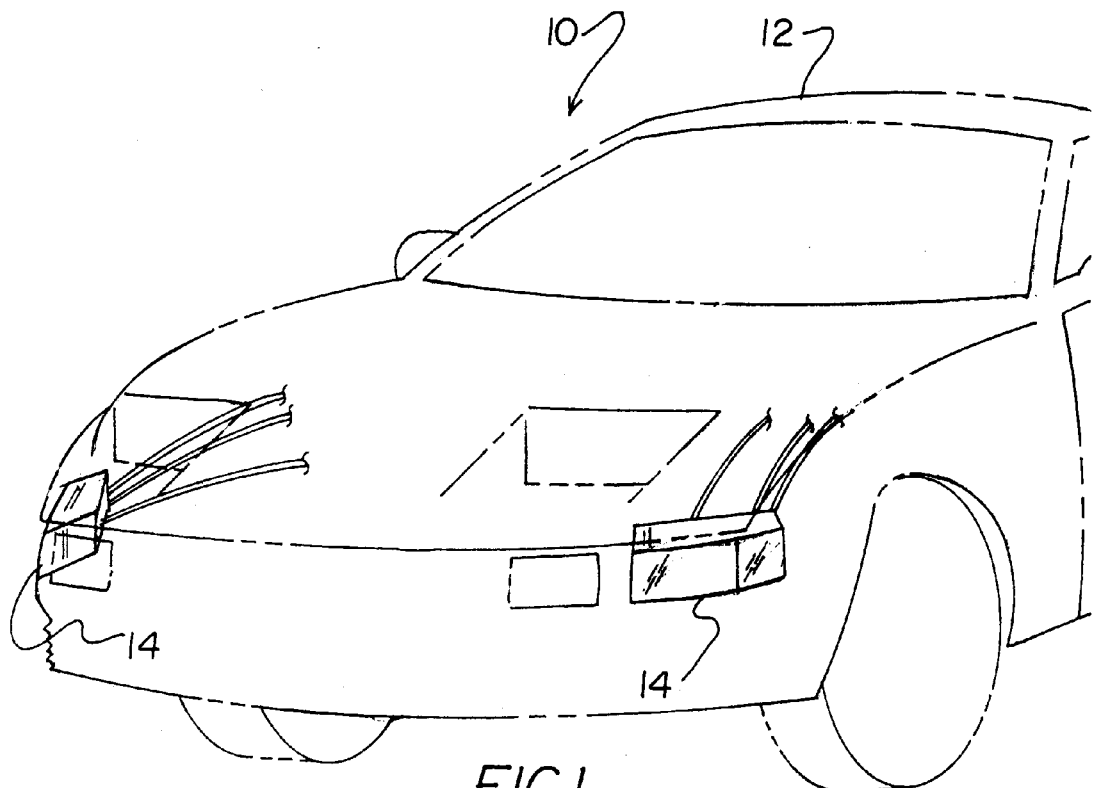
FIG. 1 is an upper perspective view of a new Vehicle Safety Emergency Flasher System according to the present invention.

With reference now to the drawings, and in particular to FIGS. 1 through 6 thereof, a new Vehicle Safety Emergency Flasher System embodying the principles and concepts of the present invention and generally designated by the reference numeral 10 will be described.

Figure 2:
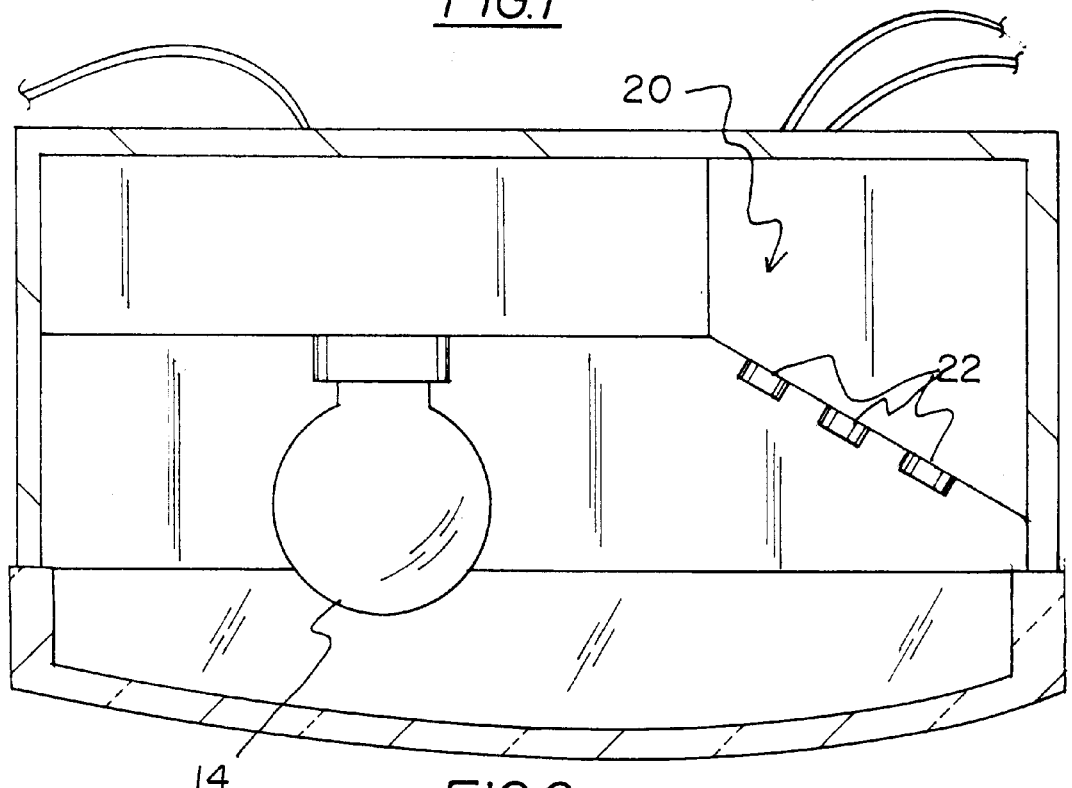
FIG. 2 is a cut-away top view of the present invention.

More specifically, it will be noted that the Vehicle Safety Emergency Flasher System 10 has a vehicle detecting means 20. The vehicle detecting means 20 may be attached within a vehicle's front portion and a vehicle's rear portion for detecting oncoming traffic towards the front portion and the rear portion of the vehicle 12. A control panel 30 has a central processing unit 60 and is electrically coupled to a plurality of hazard lights 14 within the vehicle 12. The central processing unit 60 is electrically coupled to the vehicle detecting means 20 where the vehicle detecting means 20 electrically communicates with the central processing unit 60 when the oncoming traffic approaches a selected distance away. Thereafter the central processing unit 60 electrically flashes the plurality of hazard lights 14 within the vehicle 12 thereby forewarning the oncoming traffic of the vehicle 12. As shown in FIG. 2 of the drawings, the detecting means comprises a plurality of photo-transistors 22 or other appropriate sensors for detecting motion from moving vehicles or light from a headlight of the oncoming traffic.

Figure 6:
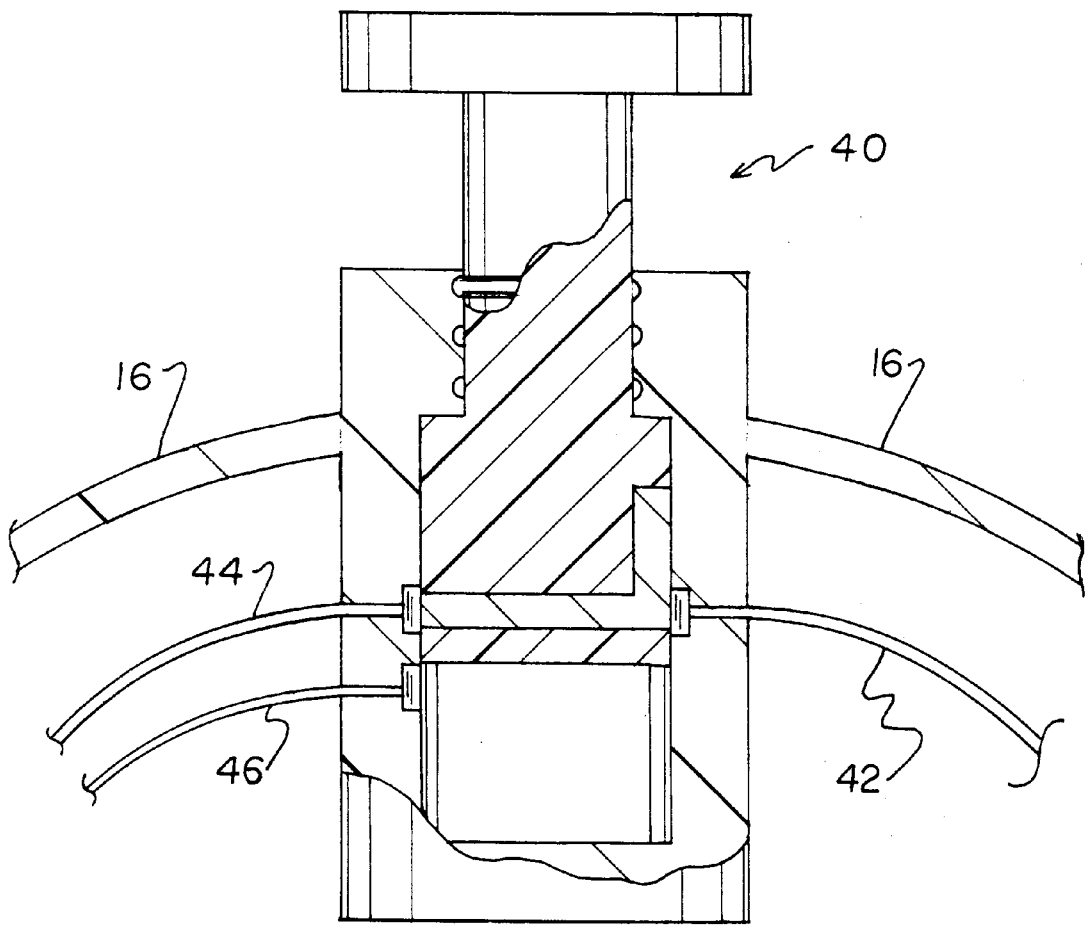
FIG. 6 is a front cut-away view of the multi-position hazard switch.

As shown in FIG. 6 of the drawings, a multi-position hazard switch 40 is electrically coupled to a power wire 42 and the central processing unit 60 through an auto flash wire 44 and a conventional hazard wire 46 for selectively controlling a mode the central processing unit 60 is operating in. The two modes comprise constant flashing of the hazard lights 14 or flashing the hazard lights 14 a finite time after the oncoming traffic passes by. Preferably, as shown in FIG. 6, the multi-position hazard switch 40 is mountable on the steering column 16 of a vehicle 12.

Figure 4:
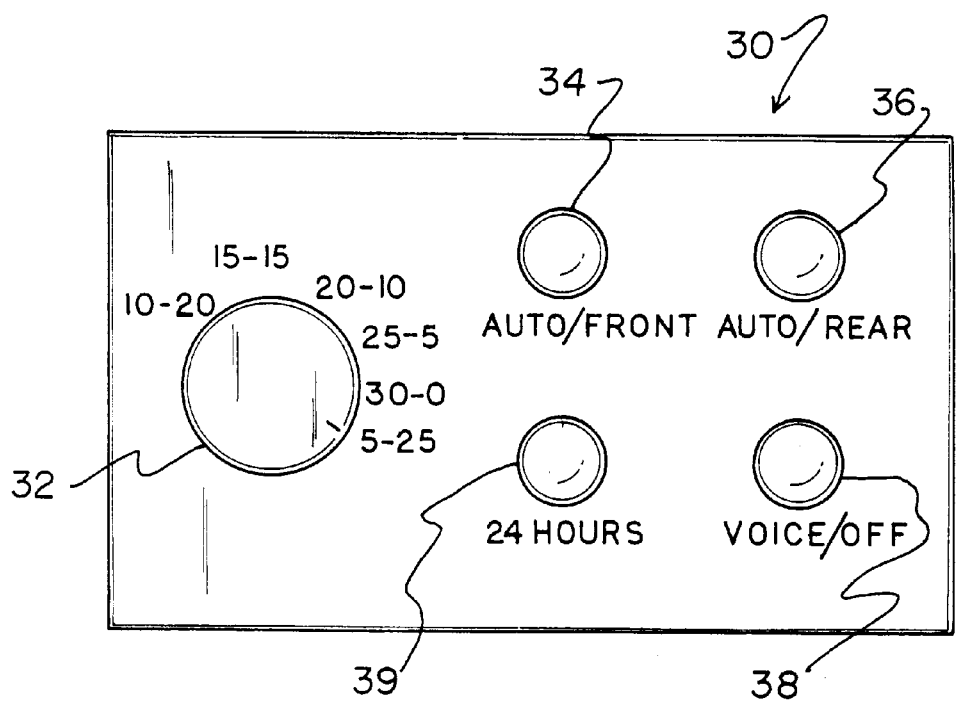
FIG. 4 is a front view of a control panel.
Figure 5:
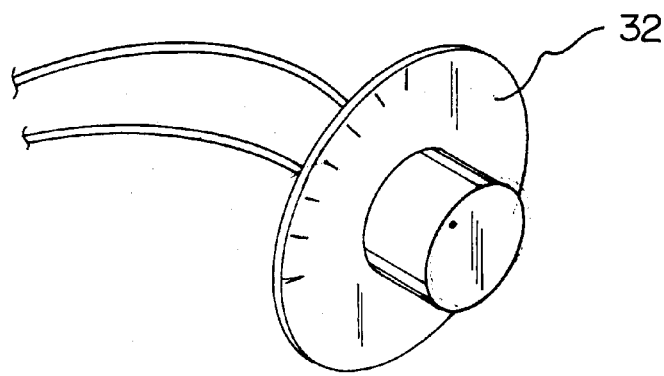
FIG. 5 is an upper perspective view of a potentiometer for controlling the flashing of the hazard lights.

As shown in FIGS. 2, 4, and 5 of the drawings, the control panel 30 comprises a potentiometer 32 electrically coupled to the central processing unit 60 for allowing a selection of the finite time. The potentiometer also is for allowing a selection of a delay time for preventing operation of the hazard lights 14 during the delay time after the finite time. The delay time's purpose is for reducing the amount of time the hazard lights 14 are in operation in a situation where there are a plurality of vehicles approaching in a group. Since there is no need to continuously flash the hazard lights 14 for each vehicle approaching, flashing the hazard lights 14 for the finite time is sufficient and the delay time prevents the central processing unit 60 from flashing the hazard lights 14 for the period of the selected delay time in the event the vehicle detecting means 20 detects another vehicle approaching during the delay time.

A front switch 34 is electrically coupled to the central processing unit 60 as shown in FIG. 4 of the drawings. When the front switch 34 is closed the vehicle detecting means 20 may detect the oncoming traffic towards the front portion of the vehicle 12 and when the front switch 34 is open the vehicle detecting means 20 is incapable of detecting the oncoming traffic towards the front portion. A rear switch 36, as shown in FIG. 4, is electrically coupled to the central processing unit 60. When the rear switch 36 is closed the vehicle detecting means 20 detects the oncoming traffic towards the rear portion of the vehicle 12 and when the rear switch 36 is open the vehicle detecting means 20 is incapable of detecting the oncoming traffic towards the rear portion. The front switch 34 and the rear switch 36 conserve a charge within a battery by preventing operation of the hazard lights 14 for oncoming traffic traveling in a lane away from the vehicle 12. When the front switch 34 is closed, the central processing unit 60 preferably is only capable of flashing a plurality of front hazard lights 14, not a plurality of rear hazard lights (not shown). When the rear switch 36 is closed, the central processing unit 60 is only capable of flashing a plurality of rear hazard lights thereby conserving a charge within a battery of the vehicle 12 by not flashing unnecessary hazard lights.

Figure 3:
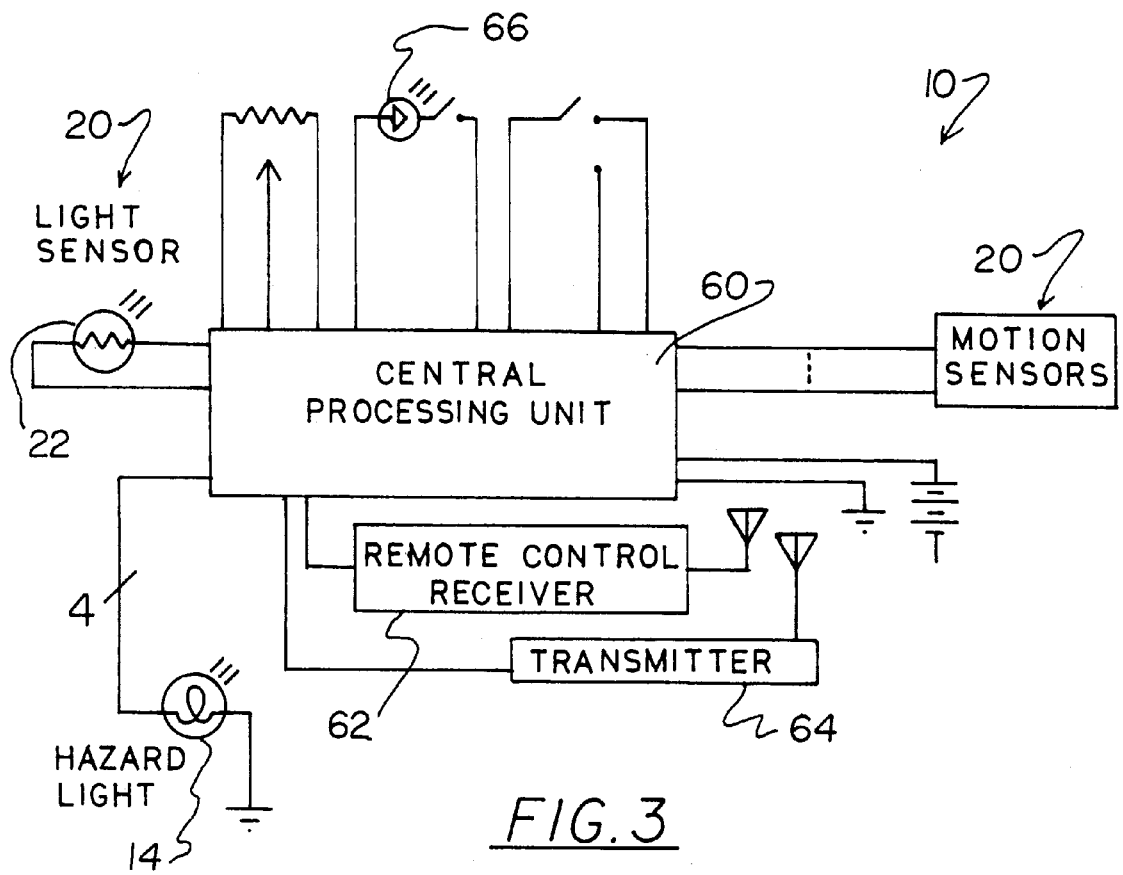
FIG. 3 is a schematic diagram of the present invention.

Ideally, as shown in FIG. 3 of the drawings, a transmitter 64 and a receiver 62 are electrically coupled to the central processing unit 60. A transmitter 64 is in the operable mode only after the multi-position hazard switch 40 activates the central processing unit 60 by means of an auto flash system wire 44, as shown in FIG. 6. The receiver 62 is in the operable mode only after a voice switch 38 located on control panel 30, as shown in FIG. 4, is manually selected.

The transmitter 64 and receiver 62 are so designed as not to operate simultaneously within the same vehicle so that a transmitter in one vehicle may communicate with the receiver in another vehicle. A voice playback means (not shown) is electrically coupled to the central processing unit 60. The voice playback means produces an audible warning to a user within a moving vehicle (not shown) that it is approaching a roadside vehicle 12 when the central processing unit 60 of the roadside vehicle 12 electrically communicates with the central processing unit (not shown) of the moving vehicle by means of a transmitter 64 of roadside vehicle 12 sending a signal to a receiver (not shown) of the approaching moving vehicle. Thus, a roadside vehicle 12 is capable of forewarning a moving vehicle from a selected distance away by means of transmitter 64 in the roadside vehicle 12 and a receiver in the moving vehicle when the roadside vehicle 12 and moving vehicle both include the new Vehicle Safety Emergency Flasher System.

Normally, the Vehicle Safety Emergency Flasher System 10 automatically activates at dusk and automatically deactivates at daybreak by means of a daylight deactivation sensor 66 electrically coupled to the central processing unit 60, as shown in FIG. 3. Ideally, as shown in FIG. 4 of the drawings, the control panel 30 includes a 24-hour override switch 39 electrically coupled to the central processing unit 60 for allowing selection of a 24-hour operational mode for the Vehicle Safety Emergency Flasher System. In such mode, the Vehicle Safety Emergency Flasher System operates for 24 hours per day. Optionally, the system operates for only a portion of the day, such as when the sky is dark (e.g., evening and night).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle safety emergency flasher system comprising:
    a vehicle detecting means, wherein said vehicle detecting means may be mounted on a vehicle's front portion and a vehicle's rear portion for detecting traffic approaching said front portion and said rear portion of said vehicle; and
    a control panel having a central processing unit and electrically coupled to a plurality of hazard lights within said vehicle, wherein said central processing unit is electrically coupled to said vehicle detecting means where said vehicle detecting means electrically communicates with said central processing unit when said oncoming traffic approaches a selected distance away whereafter said central processing unit electrically flashes said plurality of hazard lights within said vehicle thereby forewarning said oncoming traffic of said vehicle, wherein said control panel has a front switch for activating said vehicle detecting means mounted on said vehicle's front portion and said control panel has a rear switch for activating said vehicle detecting means mounted on said vehicle's rear portion.

2. The vehicle safety emergency flasher system of claim 1, including a multi-position hazard switch electrically coupled to said central processing unit for selectively controlling a mode said central processing unit is in, said mode comprising constant flashing of said hazard lights or flashing said hazard lights a finite time after said oncoming traffic passes by.

3. A vehicle safety emergency flasher system comprising:
    a vehicle detecting means, wherein said vehicle detecting means may be mounted on a vehicle's front portion and a vehicle's rear portion for detecting traffic approaching said front portion and said rear portion of said vehicle;
    a control panel having a central processing unit and electrically coupled to a plurality of hazard lights within said vehicle, wherein said central processing unit is electrically coupled to said vehicle detecting means where said vehicle detecting means electrically communicates with said central processing unit when said oncoming traffic approaches a selected distance away whereafter said central processing unit electrically flashes said plurality of hazard lights within said vehicle thereby forewarning said oncoming traffic of said vehicle;
    a multi-position hazard switch electrically coupled to said central processing unit for selectively controlling a mode said central processing unit is in, said mode comprising constant flashing of said hazard lights or flashing said hazard lights a finite time after said oncoming traffic passes by;
    a potentiometer electrically coupled to said central processing unit for allowing a selection of said finite time and for allowing a selection of a delay time for preventing operation of said hazard lights during said delay time after said finite time;
    a front switch electrically coupled to said central processing unit, wherein when said front switch is closed said vehicle detecting means detects said oncoming traffic towards said front portion of said vehicle and when said front switch is open said vehicle detecting means does not detect said oncoming traffic towards said front portion; and
    a rear switch electrically coupled to said central processing unit, wherein when said rear switch is closed said vehicle detecting means detects said oncoming traffic towards said rear portion of said vehicle and when said rear switch is open said vehicle detecting means does not detect said oncoming traffic towards said rear portion.

4. The vehicle safety emergency flasher system of claim 3, wherein said control panel further comprises a 24 hour override switch electrically coupled to said central processing unit, said vehicle detecting means detecting said oncoming traffic 24 hours per day when said 24 hour override switch is closed, said vehicle detecting means detecting said oncoming traffic from dusk to daybreak when said 24 hour override switch is open.

5. The vehicle safety emergency flasher system of claim 4, wherein a second vehicle in said oncoming traffic has a voice play back means electrically coupled to a central processing unit, said voice play back means producing an audible warning to a driver of said second vehicle within said oncoming traffic that said vehicle is nearby.

6. The vehicle safety emergency flasher system of claim 5, wherein said control panel includes a voice switch electrically coupled to said central processing unit for selectively controlling the activation of said voice play back means.

7. The vehicle safety emergency flasher system of claim 6, including:

a transmitter sending a signal at a specified frequency; and a receiver electrically coupled to said central processing unit for receiving said signal at said specified frequency, whereby said signal carries information which activates said audible warning at said selected distance.

8. The vehicle safety emergency flasher system of claim 7, wherein said detecting means comprises a plurality of photo-transistors for detecting motion from moving vehicles or light from a headlight of said oncoming traffic.

9. The vehicle safety emergency flasher system of claim 3, wherein when said front switch is closed, said central processing unit only is capable of flashing a plurality of front hazard lights; and when said rear switch is closed, said central processing unit only is capable of flashing a plurality of rear hazard lights thereby conserving a charge within a battery of said vehicle.

10. A method of operating a plurality of front hazard lights and rear hazard lights for conserving a charge within a battery of a vehicle, said method comprising:

(a) providing a vehicle detecting means, wherein said vehicle detecting means may be mounted on a vehicle's front portion and a vehicle's rear portion for detecting traffic approaching said front portion and said rear portion of said vehicle;

(b) providing a control panel having a central processing unit and electrically coupled to a plurality of hazard lights within said vehicle, wherein said central processing unit is electrically coupled to said vehicle detecting means where said vehicle detecting means electrically communicates with said central processing unit when said oncoming traffic approaches a selected distance away whereafter said central processing unit electrically flashes said plurality of hazard lights within said vehicle thereby forewarning said oncoming traffic of said vehicle;

(c) providing a front switch electrically coupled to said central processing unit, wherein when said front switch is closed said vehicle detecting means detects said oncoming traffic towards said front portion of said vehicle and when said front switch is open said vehicle detecting means does not detect said oncoming traffic towards said front portion; and (d) providing a rear switch electrically coupled to said central processing unit, wherein when said rear switch is closed said vehicle detecting means detects said oncoming traffic towards said rear portion of said vehicle and when said rear switch is open said vehicle detecting means does not detect said oncoming traffic towards said rear portion;

(e) detecting an oncoming vehicle approaching said vehicle from a front portion or a rear portion of said vehicle;

(f) flashing either said front hazard lights if said oncoming vehicle is approaching the front portion of a vehicle or flashing said rear hazard lights if said oncoming vehicles approaching the rear portion of said vehicle; and (g) terminating flashing of said hazard lights a finite time after step (e).

11. The method of claim 10 further including activating a voice playback means in said oncoming vehicle thereby warning a user within said oncoming vehicle that said oncoming vehicle is approaching said vehicle.

12. The vehicle safety emergency flasher system of claim 1, wherein said front switch is electrically coupled to said central processing unit, wherein when said front switch is closed said vehicle detecting means detects said oncoming traffic towards said front portion of said vehicle and when said front switch is open said vehicle detecting means does not detect said oncoming traffic towards said front portion, said rear switch being electrically coupled to said central processing unit, wherein when said rear switch is closed said vehicle detecting means detects said oncoming traffic towards said rear portion of said vehicle and when said rear switch is open said vehicle detecting means does not detect said oncoming traffic towards said rear portion.

13. The vehicle safety emergency flasher system of claim 1, wherein said front switch is electrically coupled to said central processing unit, wherein when said front switch is closed said vehicle detecting means detects said oncoming traffic towards said front portion of said vehicle and when said front switch is open said vehicle detecting means does not detect said oncoming traffic towards said front portion, said rear switch being electrically coupled to said central processing unit, wherein when said rear switch is closed said vehicle detecting means detects said oncoming traffic towards said rear portion of said vehicle and when said rear switch is open said vehicle detecting means does not detect said oncoming traffic towards said rear portion.

* * * * *